(12) United States Patent
Kishi

(10) Patent No.: US 6,176,349 B1
(45) Date of Patent: Jan. 23, 2001

(54) BEARING LUBRICATING DEVICE

(75) Inventor: Yoshinori Kishi, Tokyo (JP)

(73) Assignee: SKF Japan Ltd., Tokyo (JP)

( * ) Notice: Under 35 U.S.C. 154(b), the term of this patent shall be extended for 0 days.

(21) Appl. No.: 09/392,614

(22) Filed: Sep. 9, 1999

(30) Foreign Application Priority Data

Oct. 16, 1998 (JP) .................................. 10-294334

(51) Int. Cl.⁷ ..................................................... F16N 7/30
(52) U.S. Cl. .......................... 184/55.1; 384/466; 384/468
(58) Field of Search ........................ 184/55.1, 59, 55.2, 184/5; 384/466, 468

(56) References Cited

U.S. PATENT DOCUMENTS

| | | | | |
|---|---|---|---|---|
| 3,885,842 | * | 5/1975 | Furutsu ................. | 308/187 |
| 3,940,191 | * | 2/1976 | Tomioka et al. ...... | 308/187 |
| 3,951,476 | * | 4/1976 | Schulien et al. ...... | 308/114 |
| 4,942,944 | * | 7/1990 | Frey et al. ............ | 184/27.1 |

FOREIGN PATENT DOCUMENTS

| | | |
|---|---|---|
| 49-51983 | 8/1972 | (JP) . |
| 3-49419 | 5/1991 | (JP) . |
| 5-346122 | 12/1993 | (JP) . |
| 8-284961 | 11/1996 | (JP) . |

\* cited by examiner

*Primary Examiner*—David Fenstermacher
(74) *Attorney, Agent, or Firm*—Kanesaka & Takeuchi

(57) ABSTRACT

A bearing lubricating device includes: an oiling mechanism for supplying a predetermined amount of lubricating oil to a shoulder peripheral surface of a race ring of a rolling bearing located on a side of a raceway surface of the race ring of the rolling bearing; and air jetting mechanism for jetting air so as to transfer the lubricating oil on the shoulder peripheral surface toward an interior of the bearing, wherein the air jetting mechanism has a receiving space formed in a side member disposed on a side of and adjacent to a nonrotating race ring of the bearing so as to receive air from an outside as well as an air jetting slit communicating with the receiving space, the air jetting slit having an annular shape concentric with the race ring and substantially continuous in a circumferential direction and being formed to be open in such a manner as to be oriented toward the interior of the bearing.

6 Claims, 4 Drawing Sheets

BEARING LUBRICATING DEVICE

BACKGROUND OF THE INVENTION

1. Field of the Invention

The present invention relates to the technical field of a bearing lubricating device, and more particularly to an oil lubricating device for a rolling bearing which rotates at high speed.

2. Description of the Related Art

A rolling bearing which is used in a portion which rotates at high speed such as a main shaft of a machine tool is lubricated with oil. Grease is easy to handle, but since the grease is inappropriate in terms of its service life, the rolling bearing is lubricated with oil. In this lubrication with oil, it is required that the lubricating oil be supplied by an appropriate predetermined amount. Since this amount is very small, it is necessary to feed the lubricating oil reliably to raceway surfaces of the bearing. As a means for feeding the lubricating oil to the raceway surfaces, air which is jetted from a nozzle or nozzles has been used. Conventionally, the lubricating oil and the air are fed by the same pipe or separate pipes each formed in the shape of a nozzle. In either case, however, such pipes are disposed in such a manner as to be oriented toward the inner space of the bearing at one location or a number of locations in the circumferential direction of the bearing.

The plurality of rolling elements of the rolling bearing are arranged at intervals in the circumferential direction by means of a retainer, and are adapted to revolve and travel on the raceway surfaces of the race rings as the bearing rotates. In addition, the air which is directed toward the inner space of the bearing for feeding the lubricating oil is jet-like high-speed air which is jetted out from the pipe at one location or the pipes at a number of locations in the circumferential direction as described above, and is intermittently interrupted by the aforementioned rolling elements which revolve and travel. Consequently, the rolling bearing issues high-frequency noise and harms the working environment of the machine tool.

SUMMARY OF THE INVENTION

Accordingly, it is an object of the present invention to provide a bearing lubricating device which is capable of reducing such noise and of feeding a very small amount of lubricating oil to the raceway surfaces reliably.

To this end, in accordance with the present invention, there is provided a bearing lubricating device comprising: oiling means for supplying a predetermined amount of lubricating oil to a shoulder peripheral surface of a race ring of a rolling bearing located on a side of a raceway surface of the race ring of the rolling bearing; and air jetting means for jetting air so as to transfer the lubricating oil on the shoulder peripheral surface toward an interior of the bearing, wherein the air jetting means has a receiving space formed in a side member disposed on a side of and adjacent to a nonrotating race ring of the bearing so as to receive air from an outside as well as an air jetting slit communicating with the receiving space, the air jetting slit having an annular shape concentric with the race ring and substantially continuous in a circumferential direction and being formed to be open in such a manner as to be oriented toward the interior of the bearing.

With the above-described bearing lubricating device in accordance with the present invention, the air jetting slit has an annular shape which is formed to be substantially continuous in the circumferential direction, and the jetting of air is effected uniformly and continuously in the entire circumferential direction. Consequently, the air does not produce intermittent interruption noise which is otherwise caused by the rolling elements. Hence, the nose is remarkably reduced.

In the present invention, in the case where an outer ring of the race rings is nonrotatable, if the oiling means is formed as an oiling port formed in the outer ring and leading to the shoulder peripheral surface, and the air jetting slit is provided at a substantially identical radial position to that of the shoulder peripheral surface, since the lubricant is supplied to the shoulder peripheral surface located close to the raceway surface, the lubricant is made to reach the raceway surface more reliably.

In addition, in the case where an inner ring of the race rings is rotatable, an arrangement can be provided such that the side member has an approach portion which approaches to the interior of the bearing up to a position which is close to the shoulder peripheral surface of the inner ring, an annular slit is formed as the air jetting slit between an inner peripheral surface of the approach portion of the side member and the shoulder peripheral surface of the inner ring, and the oiling means is formed by an oiling port provided in the side member in such a manner as to lead to an intermediate portion of the air jetting slit. By adopting the above-described arrangement, since the lubricating oil is supplied to the inner ring side, the lubricating oil reaches the outer ring side from the inner ring side owing to the pumping effect based on the centrifugal force which the air obtains as the bearing rotates, with the result that the overall bearing is lubricated reliably. The higher the rotating speed of the bearing, the more this pumping effect increases. Furthermore, in this case, it is more effective if the air jetting slit is formed in such a manner as to be inclined radially outward toward the interior of the bearing. In addition, if the approach portion has a surface which is close to an inner peripheral surface of a retainer, the lubricating oil reaches more reliably the surfaces of the rolling elements and the raceway surfaces via the surfaces of the rolling elements.

In the present invention, the air jetting means and the oiling means can be provided separately, but it is possible to integrate the two means, and the lubricating oil may be adapted to be transferred by the air flowing in the air jetting slit, in such a manner as to creep over an inner wall surface of the air jetting slit.

The above and other objects, features and advantages of the present invention will become more apparent from the following detailed description of the invention when read in conjunction with the accompanying drawings.

DESCRIPTION OF THE PREFERRED EMBODIMENTS

Referring now to the accompanying drawings, a description will be given of the embodiments of the present invention.

Figure 1:
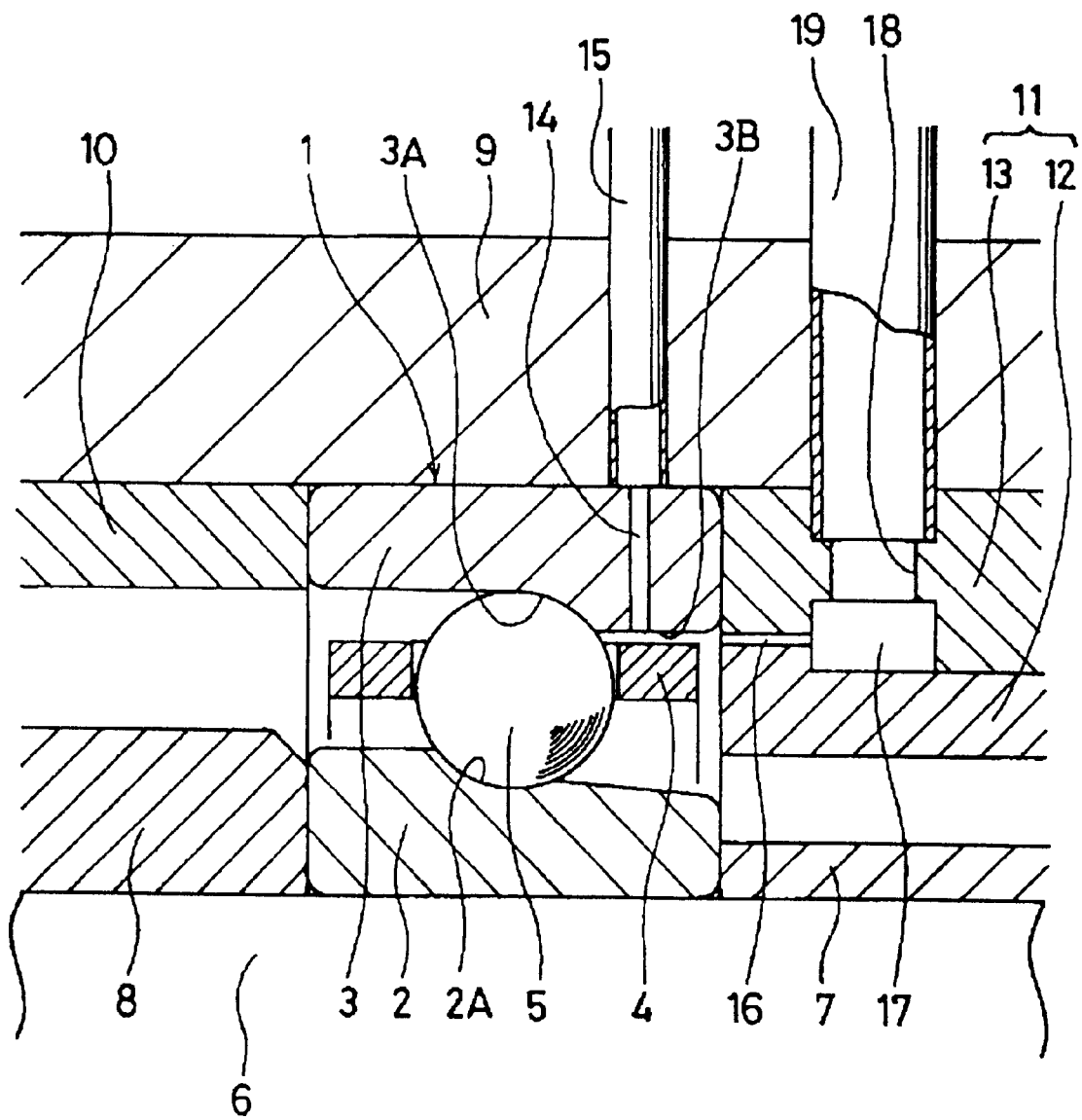
FIG. 1 is a cross-sectional view illustrating the device in accordance with an embodiment of the present invention.

The embodiment shown in FIG. 1 is an example in which the present invention is applied to an angular-contact ball bearing, and an oiling means and an air jetting means are provided separately.

In FIG. 1, reference numeral 1 denotes an angular-contact ball bearing which includes an inner ring 2, an outer ring 2, and balls 5 which are rolling elements held at intervals in the circumferential direction by a retainer 4. This bearing 1 is mounted on a rotating shaft member 6, and the inner ring 2 is positioned in an axial direction by means of spacer rings 7 and 8 which are located on both axial sides with respect to the inner ring 2 and are disposed on the rotating shaft member 6. The nonrotating outer ring 3 is inserted and fitted in a hole surface of a housing 9, and is axially positioned by a spacer ring 10 and a side member 11 which are disposed in such a manner as to abut against this hole surface.

An oiling port 14 is formed in the aforementioned outer ring 3 in such a manner as to extend through the outer ring 3 in the radial direction of the bearing, and the oiling port 14 is open at a shoulder inner peripheral surface 3B located adjacent to an axial side of a raceway surface 3A where the balls roll and travel. The oiling port 14 is formed at one location or a plurality of locations in the circumferential direction. In addition, in the housing 9, an oiling pipe 15 is inserted in and connected to a hole which is formed at a circumferential position corresponding to the aforementioned oiling port 14, and the oiling pipe 15 communicates with the corresponding oiling port 14 and together constitutes an oiling means. A predetermined amount of lubricating oil is supplied to the oiling pipe 15 from an unillustrated external oiling device.

Meanwhile, the side member 11 is comprised of an inner member 12 and an outer member 13, and the two members 12 and 13 are fitted to each other in their right-hand portions in FIG. 1, and form an annular air jetting slit 16 between them. The annular air jetting slit 16 is concentric with the outer ring 3, is located at substantially the same position as the shoulder inner peripheral surface 3B of the outer ring 3 in the radial direction of the bearing, and is formed in a hollow cylindrical shape, thereby forming a continuous space in the circumferential direction. It suffices if the air jetting slit 16 is substantially continuous in the circumferential direction, and need not be completely continuous. Further, an annular chamber 17 serving as a receiving space communicating with the air jetting slit 16 is formed between the inner member 12 and the outer member 13. A connecting hole or holes 18 which communicate with the annular chamber 17 and are open at the outer peripheral surface are formed in the outer member 13 in the circumferential direction thereof. In addition, an oiling pipe or oiling pipes 19 are connected to the housing 9 at a position or positions corresponding to the connecting hole or connecting holes 18, and air from an unillustrated external air supplying pipe is supplied to the annular chamber 17 through the air supplying pipe(s) 19 and the connecting hole(s) 18. The air jetting slit 16 and the air supplying pipe(s) 19 constitute the air jetting means. The air is jetted from the annular air jetting slit 16 extending from the annular chamber 17 in the circumferential direction, toward the shoulder inner peripheral surface 3B at an axial flow rate which is distributed uniformly and continuously in the circumferential direction.

In such a device of this embodiment, a predetermined very small amount of lubricating oil is supplied from the oiling port 14 in the outer ring 3 to the shoulder inner peripheral surface 3B, as described above. With respect to the shoulder inner peripheral surface 3B, the jetted air from the annular air jetting slit 16 is blown toward the interior of the bearing at an axial flow rate which is circumferentially uniform, and the lubricating oil on the shoulder inner peripheral surface 3B reaches the raceway surface 3A of the outer ring 3 by being entrained by this air flow. Since the balls 5 revolve and travel on the raceway surface 3A and also rotate, the lubricating oil reaches the raceway surface 2 of the inner ring 2 as well. Thus satisfactory lubrication is effected.

At that juncture, since the air jetting slit 6 is open continuously in the circumferential direction, the jetted air is also made uniform in the entire circumferential direction, so that the interruption noise of jetted air caused by the traveling of the balls does not practically occur. Accordingly, high-frequency noise which constitutes the above-described interruption noise of air which occurred with the conventional device does not occur even in the high-speed rotation.

Figure 2:
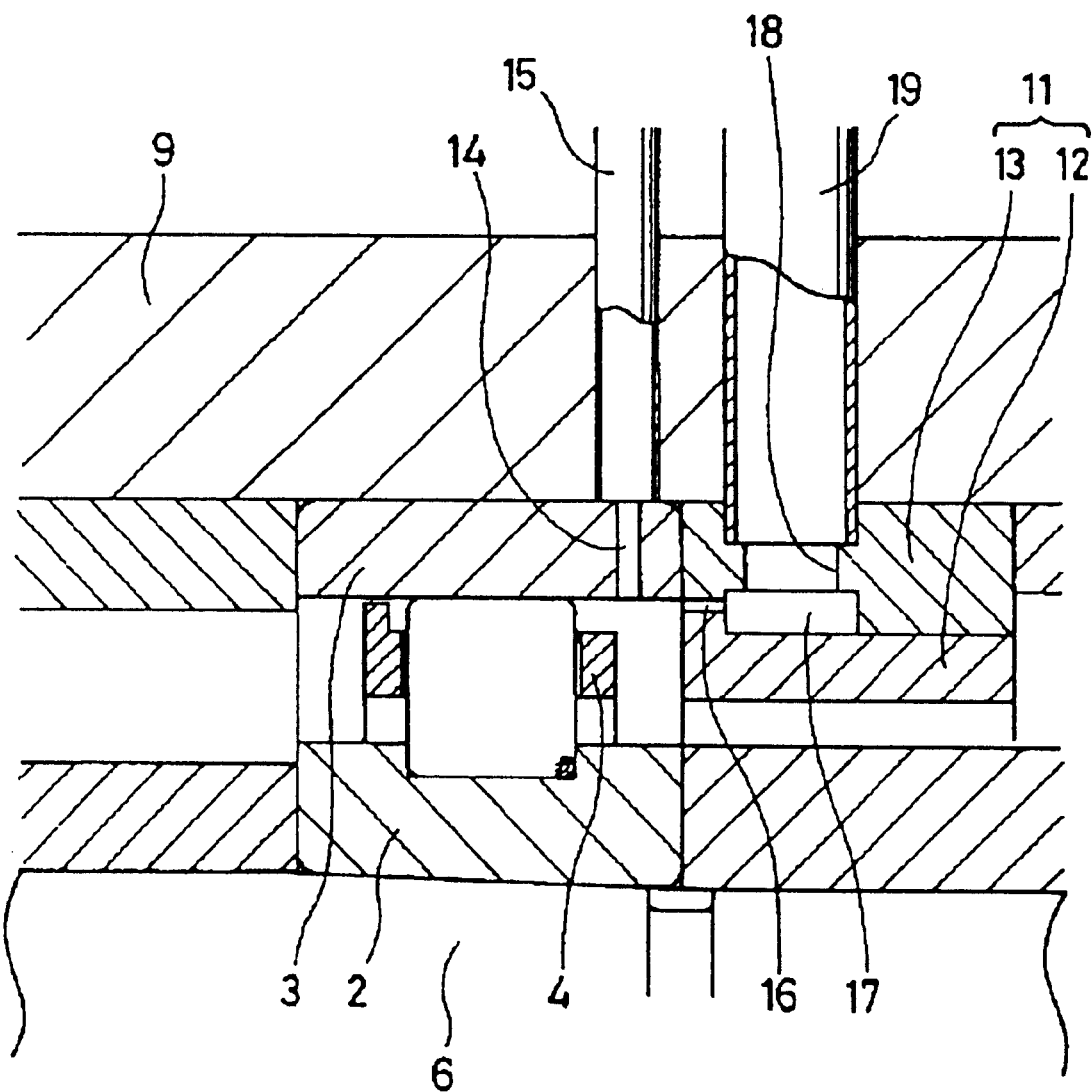
FIG. 2 is a cross-sectional view illustrating a modification of the device shown in FIG. 1.

FIG. 2 illustrates a modification of the embodiment shown in FIG. 1, and shows that the present invention is also applicable to other types of bearings, e.g., a cylindrical roller bearing, as in the illustrated case. It should be noted that, in FIG. 2, portions that are common to those of the device shown in FIG. 1 are denoted by the same reference numerals.

Figure 3:
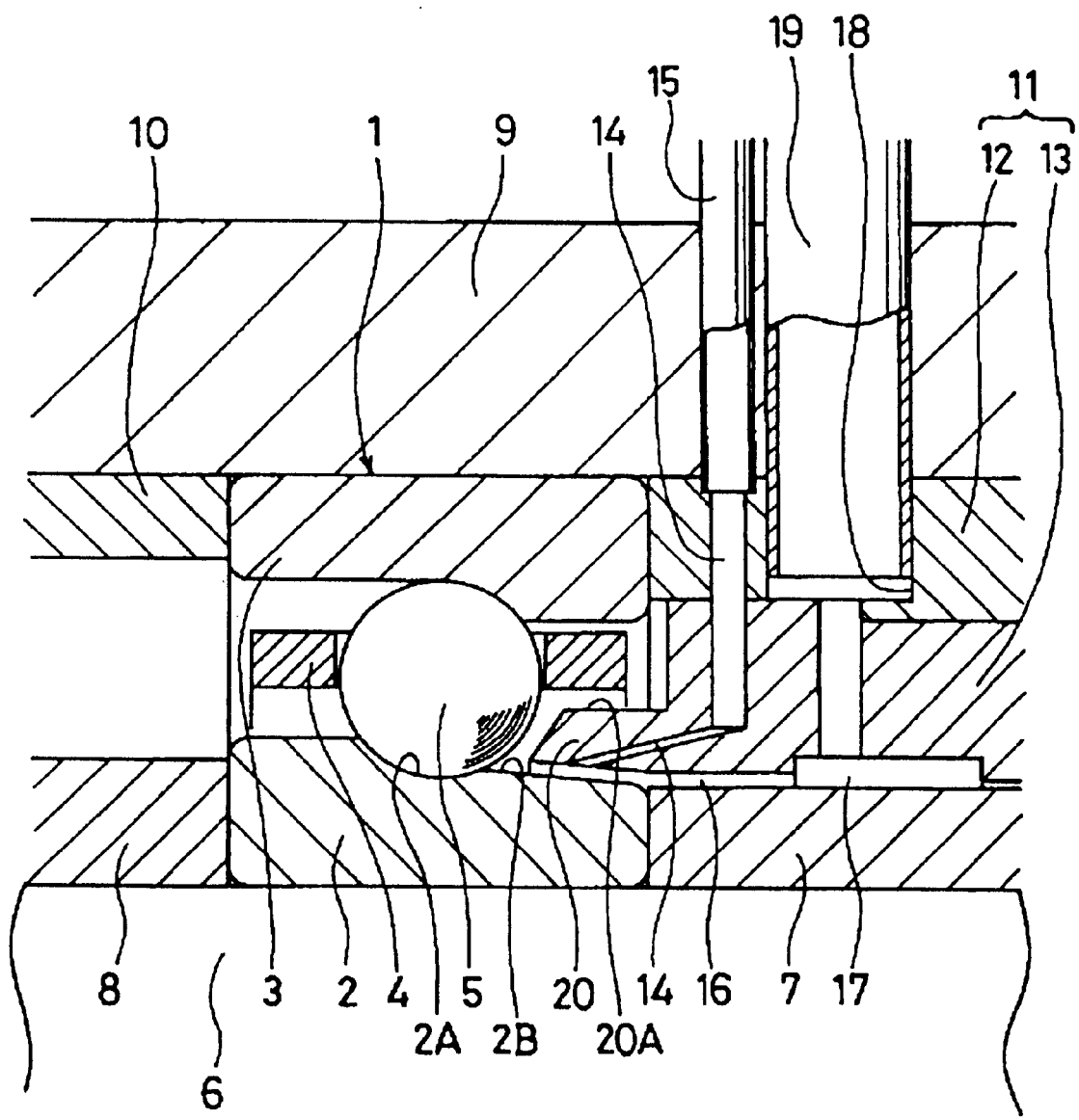
FIG. 3 is a cross-sectional view illustrating the device in accordance with another embodiment of the present invention.

Referring next to FIG. 3, a description will be given of another embodiment of the present invention.

In this device shown in FIG. 3 as well, portions that are common to those of the device shown in FIG. 1 are denoted by the same reference numerals, and a description thereof will be omitted.

The device of the embodiment shown in FIG. 3 is characterized in that, in comparison with the device shown in FIG. 1, the oiling port 14 is formed in the side member 11, that the side member 11 has an approach portion 20 which approaches toward the interior of the bearing such that the annular air jetting slit 16 which is circumferentially continuous is formed between the inner peripheral surface of the approach portion 20 and a shoulder outer peripheral surface 2B of the inner ring 2 which rotates, in such a manner as to be radially outwardly inclined toward the interior of the bearing, and that the oiling port 14 is open at the air jetting slit 16 toward the shoulder outer peripheral surface 2B of the inner ring 2.

In the device of this embodiment, the lubricating oil is drip-fed from the oiling port 14 to the air jetting slit 16. This lubricating oil is transferred to the interior of the bearing by the air flow inside the air jetting slit 16, and is fed to a raceway surface 2A by the jetted air. In addition, before reaching the raceway surface 2A, part of the lubricating oil also reaches the raceway surface 3A of the outer ring 3 by being entrained by the radially outward flow of the air inside the bearing due to the centrifugal force caused by the rotation of the bearing (so-called pumping effect). Thus the lubricating oil is reliably spread to the inner and outer rings.

In addition, in this embodiment, the approach portion 20 has a surface 20A which is close to the inner peripheral surface of the retainer 4 and is located on its side which is away from the inner ring 2 side thereof. When part of the lubricating oil has been transmitted along the surface of the approach portion 20 and has reached the surface 20A, that lubricating oil is transferred to the inner peripheral surface of the retainer 4 and therefrom reaches the balls 5 which are the rolling elements. Then, the raceway surfaces 2A and 3A are reliably lubricated through these balls 5.

Figure 4:
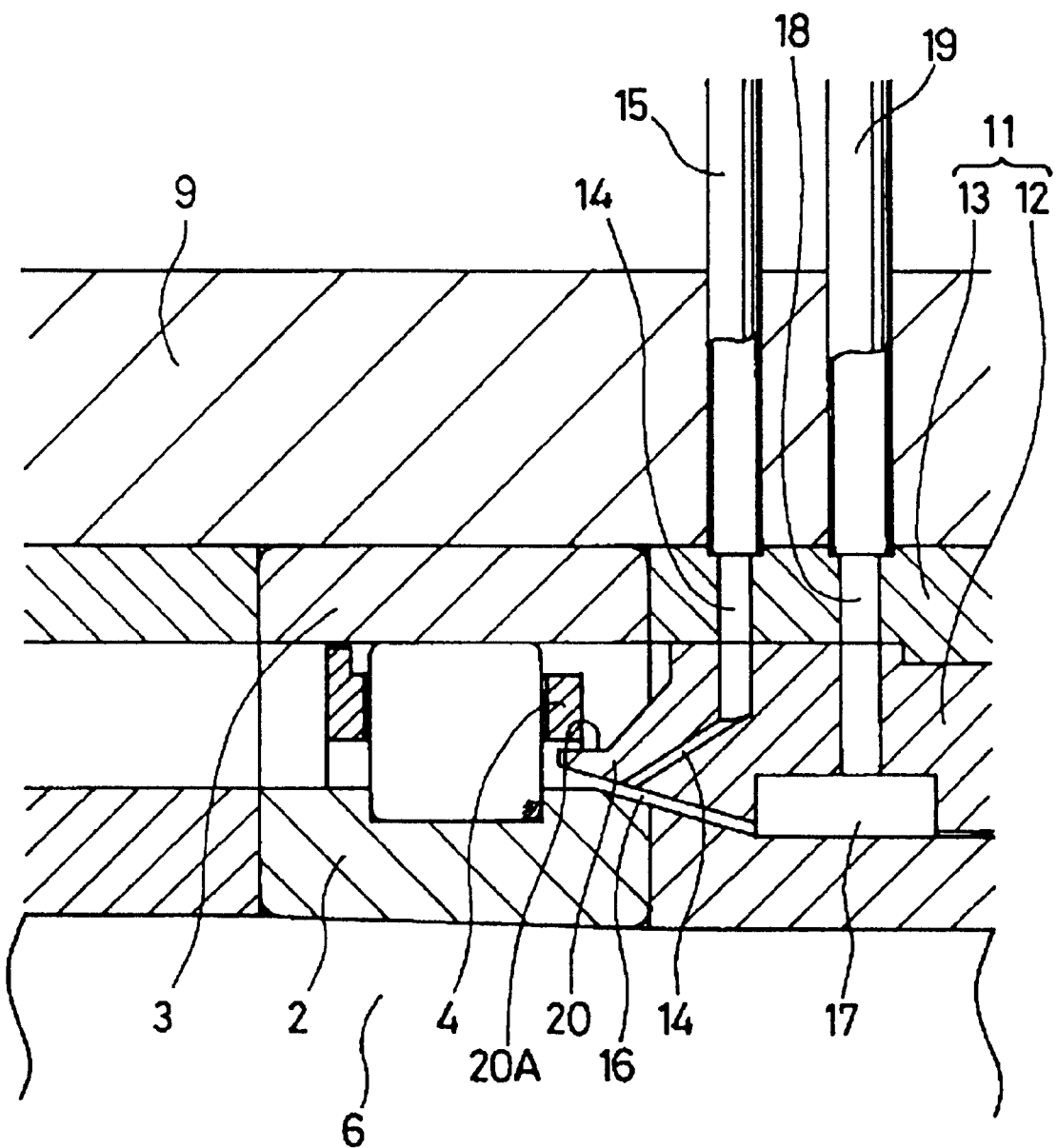
FIG. 4 is a cross-sectional view illustrating a modification of the device shown in FIG. 3.

In this embodiment as well, since the air jetting slit 16 is formed continuously in the circumferential direction, the noise occurring as the jetted air reaches the rolling elements does not become large, as in the embodiment shown in FIG. 1. Furthermore, this embodiment is also applicable to a cylindrical roller bearing as shown in FIG. 4 in the same way as the device in FIG. 1 can be modified as the device shown in FIG. 2. It should be noted that, in FIG. 4, portions that are common to those of FIG. 3 are denoted by the same reference numerals.

In the present invention, various modifications are possible in addition to those shown in FIGS. 1 to 4. Although, in the illustrated examples, the oiling means comprised of the oiling pipe and the oiling port and the air jetting means comprised of the oiling pipe and the air jetting slit are formed in such a manner as to form separate passages, the two means can be combined into one so that the air jetting means also serves as the oiling means. Such a form is suitable as a lubricating device of the so-called air-oil type in which a very small amount of lubricating oil is transferred in such a manner as to creep over the inner wall surface of the oiling pipe.

What is claimed is:

1. A bearing lubricating device comprising:

oiling means for supplying a predetermined amount of lubricating oil to a shoulder peripheral surface of a race ring of a rolling bearing located on a side of a raceway surface of said race ring of said rolling bearing; and air jetting means for jetting air so as to transfer the lubricating oil on said shoulder peripheral surface toward an interior of said bearing, wherein said air jetting means has a receiving space formed in a side member disposed on a side of and adjacent to a nonrotating race ring of said bearing so as to receive air from an outside as well as an air jetting slit communicating with said receiving space, said air jetting slit having an annular shape concentric with said race ring and substantially continuous in a circumferential direction and being formed to be open in such a manner as to be oriented toward the interior of said bearing.

2. The bearing lubricating device according to claim 1, wherein an outer ring of said race rings is nonrotatable, said oiling means is formed as an oiling port formed in said outer ring and leading to said shoulder peripheral surface, and said air jetting slit is provided at a substantially identical radial position to that of said shoulder peripheral surface.

3. The bearing lubricating device according to claim 1, wherein an inner ring of said race rings is rotatable, said side member has an approach portion which approaches to the interior of said bearing up to a position which is close to said shoulder peripheral surface of said inner ring, an annular slit is formed as said air jetting slit between an inner peripheral surface of said approach portion of said side member and said shoulder peripheral surface of said inner ring, and said oiling means is formed by an oiling port provided in said side member in such a manner as to lead to an intermediate portion of said air jetting slit.

4. The bearing lubricating device according to claim 3, wherein said approach portion has a surface which is close to an inner peripheral surface of a retainer and is located on a side thereof which is away from an inner ring side thereof.

5. The bearing lubricating device according to claim 3, wherein said air jetting slit is formed in such a manner as to be inclined radially outward toward the interior of said bearing.

6. The bearing lubricating device according to claim 1, wherein said air jetting means also serves as said oiling means, and the lubricating oil is adapted to be transferred by the air flowing in said air jetting slit, in such a manner as to creep over an inner wall surface of said air jetting slit.

\* \* \* \* \*